United States Patent
Oster et al.

[19]

[11] Patent Number: 5,999,661
[45] Date of Patent: *Dec. 7, 1999

[54] IMAGE PROCESSING METHOD AND SYSTEM

[75] Inventors: Jan Oster, Copenhagen; Niels V. Knudsen, Hellerup, both of Denmark

[73] Assignee: Phase One Denmark A/S, Frederiksberg, Denmark

[ * ] Notice: This patent issued on a continued prosecution application filed under 37 CFR 1.53(d), and is subject to the twenty year patent term provisions of 35 U.S.C. 154(a)(2).

[21] Appl. No.: 08/745,052

[22] Filed: Nov. 7, 1996

[30] Foreign Application Priority Data

Mar. 13, 1996 [DK] Denmark .................................. 0292/96

[51] Int. Cl.⁶ .............................. G06K 9/36; G06K 9/40; H04N 5/228; G03B 17/00
[52] U.S. Cl. .......................... 382/276; 382/255; 348/222; 348/229; 396/297; 396/299; 396/310
[58] Field of Search ..................................... 382/276, 255; 358/447; 348/222, 223, 226, 227, 229; 396/292, 297, 299, 310

[56] References Cited

U.S. PATENT DOCUMENTS

| | | | |
|---|---|---|---|
| 4,016,576 | 4/1977 | Nomura | 396/292 |
| 4,868,671 | 9/1989 | Murakami | 358/447 |
| 5,313,251 | 5/1994 | Fierstein et al. | 355/77 |
| 5,386,228 | 1/1995 | Okino | 348/218 |
| 5,402,338 | 3/1995 | Ito | 600/407 |

FOREIGN PATENT DOCUMENTS

| | | |
|---|---|---|
| 0271912 | 6/1988 | European Pat. Off. . |
| 0519719 | 12/1992 | European Pat. Off. . |

OTHER PUBLICATIONS

Brian Pontifex et al.: "Design of a High Resolution Programmable Digital Camera" Proceedings of the SPIE—The International Society for Optical Engineering, vol. 2173, 1994, USA, pp. 130–140, XP000614502.

*Primary Examiner*—Phuoc Tran
*Assistant Examiner*—Daniel G. Mariam
*Attorney, Agent, or Firm*—Jones Volentine, L.L.P.

[57] ABSTRACT

An image processing system and method for processing a source digital image with a first energy sensitivity parameter value and including first pixels of first pixel values into a target digital image with a selected second energy sensitivity parameter value and including second pixels of second pixel values, for enabling a photographer to adjust resolution and sensitivity of a digital image to correspond to the light sensitivity of a specific photographic film. Thus, the photographer can use a light meter to indicate pairs of exposure time and diaphragm settings for the electronic camera that will ensure a correct exposure of the digital image when the light meter is set to indicate correct pairs of exposure time and diaphragm settings for a camera.

10 Claims, 3 Drawing Sheets

IMAGE PROCESSING METHOD AND SYSTEM

FIELD OF THE INVENTION

The present invention relates to an image processing method and system for interrelated adjustment of brightness and resolution of an image that is produced from a digital image, whereby, for example, the intensity of light illuminating an object to be recorded by an electronic camera can be reduced significantly compared to the intensity requirements of known methods and systems.

BACKGROUND OF THE INVENTION

It is well known to represent an image digitally by dividing the image into a large number of segments, denoted pixels, and allocating digital values, denoted pixel values, to each pixel. Typically, the image is divided into a matrix of rows and columns of pixels and the size of a digital image is then given by the number of pixels in a row and the number of pixels in a column. The pixel values are typically stored in an array in a digital memory. For example, a grey tone image may be represented digitally by a digital image comprising pixels each of which has one pixel value representing the grey tone of the corresponding pixel. Similarly, a color image may be represented by a digital image comprising pixels each of which has three pixel values, one for each of the colors red, green, and blue.

Typically, a digital image is created by transmission of light towards an object and detection by an electronic camera of light reflected from or transmitted through the object. However, in general a digital image may be created by transmission of any kind of radiated energy, such as electromagnetic radiation, such as visible light, infrared radiation, ultraviolet radiation, X-rays, radio waves, etc, ultrasound energy, particle energy, such as electrons, neutrons, etc, etc, towards an object for interaction with the object and by detection of energy having interacted with the object, such as by reflection, refraction, absorption, etc.

A digital image may be formed by any imaging system, such as radiometer systems, infrared systems, radar systems, ultrasound systems, X-ray systems, electronic cameras, digital scanners, etc, adapted to detect the kind of energy in question and to generate a digital image based on the energy detection.

The amount of energy needed to record a digital image with a desired signal to noise ratio, i.e. the sensitivity of the imaging system, is determined by the noise level in the imaging system. Energy detectors of any kind generate noise that adds to the signal desired to be recorded. The signal to noise level of a digital image is typically required to be comparable to if not better than the signal to noise level of an image recorded on a photographic film for subsequent reproduction in professional publications.

Typically, an image recording system operating in the visible light range of electromagnetic radiation, such as an electronic camera, a digital camera, an electronic scanner, a digital scanner, etc, uses a solid state imaging device, typically a charge coupled device (CCD), for recording of an image. The CCD is an array of a large number of light sensitive detectors connected to each other as an analog shift register. In each detector of the CCD a charge is formed that is proportional to the light energy incident on the detector during an integration period. The analog charge of each detector is shifted serially out of the CCD and is typically converted to a digital value whereby a digital representation of the recorded image is formed. Each pixel value of the digital image is equal to the digitized charge of the corresponding CCD detector. The pixel values may be transferred to an external computer through a computer interface or may be stored on a memory card or on a rotating magnetic recording medium.

It is known in the art to use linear CCDs in an image recording system in which the linear CCDs light-sensing detectors are arranged in a single line. Typically, the array is moved across the image, scanning it one line at a time. For color images, filters can be placed in front of the array, which then makes three passes across the image during image recording.

Offering a good compromise of image resolution (high pixel count) and cost in an image recording system is the trilinear CCD array, which comprises three linear CCDs positioned side by side. Each line is covered by its own color filter. The array makes a single pass across the image, and each linear CCD records a line at a time.

At a higher cost, a two-dimensional CCD array can capture the entire image in a very short time. Three separate exposures with three color filters can be used to make a color representation. For example, the color filters can be placed in a rotating wheel that sequentially inserts each color filter in the optical path between the image forming optics of the image recording system and the two-dimensional CCD array.

In the present context, the term exposure is to be understood in a broad sense as the time period during which an energy sensor is actually sensing the energy. For example, a photographic film is exposed to light whenever light is incident upon it, while a CCD is exposed to light when the elements of the CCD are allowed to integrate light incident upon them. The CCD is not exposed when its light sensing elements are short-circuited although light may be incident upon them.

It is well known in the art to size a digital image, i.e. to change, typically reduce, the size of the digital image, i.e. the number of pixels of the digital image in order to minimize the amount of pixel data to be stored for later processing of the digital image. Various, sometimes complex, strategies for forming sets of pixels from which new pixel values are calculated may be employed. In a very simple example, a digital image may be down-sized by reducing the number of pixels of the digital image by an integer, e.g. by a number of four. In this case, the pixels of the original digital image is divided into sets of four pixels each and each set of pixels is transformed into a new pixel of a pixel value equal to the average value of the original pixel values. Thereby, a new digital image of one fourth the size of the original digital image is generated.

Further, it is well-known to adjust brightness of an image produced from a digital image by forming a new digital image with the same number of pixels as the original image in which each of the new pixel values is generated by a linear or non-linear transformation of the corresponding original pixel value.

Replacement of conventional cameras for photographing and recording images by use of the photosensitivity of photographic films by electronic cameras has gained increasing attention in recent years.

In photography, it is well known to use photographic films of different light sensitivity and optical resolution. Typically, a photographic film with good light sensitivity has a lower optical resolution than a film with a lower light sensitivity. Simultaneously, the less light that is needed to expose a film the more depth of focus can be obtained. Thus, a photographer is accustomed to work out compromises between the three parameters of a recorded image: resolution, light sensitivity and depth of focus.

In working out such compromises, the photographer uses a light meter. Based on the light sensitivity of the film in the camera and the intensity of light incident on the light meter, the light meter indicates pairs of exposure time and diaphragm settings that will ensure a correct exposure of the photographic film.

It is known to specify the light sensitivity of an electronic camera as a parameter corresponding to the light sensitivity of a photographic film, e.g. as an ASA value. For example, the light sensitivity of an electronic camera may be specified as 400 ASA. This means that a photographer can use a light meter to indicate pairs of exposure time and diaphragm settings for the electronic camera that will ensure a correct exposure of the recorded image when the light meter is set to indicate correct pairs of exposure time and diaphragm settings for a camera with a 400 ASA photographic film.

It is seen that there are resemblances between a digital image, e.g. recorded with a CCD array, and an image recorded on a photographic film. A photographic film comprises light sensitive particles that chemically stores information about light energy incident upon them during an exposure period. By increasing the density of particles on a film, the resolution of the film is increased while the light sensitivity of the film is decreased. Thus, resolution and light sensitivity of a photographic film is interrelated.

Similarly, the number of pixels in a digital image defines the resolution of the digital image and the pixel values of a recorded image correspond to the information chemically stored in the light sensitive particles on the photographic film.

Thus, by analogy with a photographic film, a digital image comprising pixel locations in a memory holding pixel values can be seen to correspond to a developed photographic film while the set of pixel locations in a memory for holding pixel values of a digital image may be said to constitute a virtual film.

OBJECTS OF THE INVENTION

It is an object of the present invention to provide an image processing method for interrelated adjustment of resolution, i.e. number of pixels, and sensitivity of a virtual film for holding a digital image.

It is another object of the present invention to provide an image processing system utilising such a method.

It is still another object of the present invention to provide an image processing method comprising a user interface method and an image processing system comprising a user interface means that enables the user to adjust, as described above, interrelated resolution and sensitivity of a digital image to correspond to the light sensitivity of a specific photographic film by selection of a light sensitivity parameter of the photographic film in question, e.g. by selection of an ASA value, a DIN value, an ISO value, etc. For example, a photographer using an image processing system according to the invention may select a light sensitivity parameter value for the system equal to 400 ASA. Then, the photographer can use a light meter to indicate pairs of exposure time and diaphragm settings for the electronic camera that will ensure a correct exposure of the digital image when the light meter is set to indicate correct pairs of exposure time and diaphragm settings for a camera with a 400 ASA photographic film.

According to the invention these and other objects are fulfilled by a method of processing (a) a source digital image with a first energy sensitivity parameter value and including first pixels of first pixel values into (b) a target digital image with a selected second energy sensitivity parameter value and including second pixels of second pixel values, said method comprising the steps of selecting a desired second energy sensitivity parameter value for the target digital image, calculating the number of second pixels in the target digital image corresponding to the selected second energy sensitivity parameter value from the number of first pixels in the source image and the first energy sensitivity parameter value, and successively for each of the second pixels forming a corresponding set of first pixels and transforming the set of first pixels into the second pixel of the second pixel value so as to form a target digital image comprising said second pixels and having the desired energy sensitivity parameter value.

Further, an image processing system is provided for processing (a) a source digital image with a first energy sensitivity parameter value and including first pixels of first pixel values into (b) a target digital image with a selected second energy sensitivity parameter value and including second pixels of second pixel values, said system comprising user interface means for generating a desired operator selected second energy sensitivity parameter value for the target digital image, a first processor means for calculating the number of second pixels in the target digital image corresponding to the selected second energy sensitivity parameter value from the number of first pixels and the first energy sensitivity parameter value, and a second processor means for successively for each of the second pixels forming a corresponding set of first pixels and transforming the set of first pixels into the second pixel of the second pixel value so as to form a target digital image comprising said second pixels and having the desired energy sensitivity parameter value.

The first digital image may be recorded by an electronic camera. If the electronic camera operates in the visible light range of the electromagnetic spectrum, the energy sensitivity parameter is equal to a light sensitivity parameter, e.g. specified as an ASA value, a DIN value, an ISO value, etc.

The energy sensitivity parameter of a digital image is defined as the energy sensitivity parameter of an imaging system for recording the digital image and, the energy sensitivity parameter value determines how much energy is needed for exposure of the system for recording of an image with a correct exposure. For example, in photography, the energy sensitivity parameter is a light sensitivity parameter of the photographic film in the camera. Based on the light sensitivity of the photographic film in the camera and the intensity of light reflected from the object to be recorded and incident on a light meter, the light meter indicates pairs of exposure time and diaphragm settings that will ensure a correct exposure of the photographic film.

The first processing means may be positioned in the camera or in a computer external to the camera to which the recorded image may be transferred for further processing.

Likewise, the second processing means may be positioned in the camera or in a computer external to the camera to which the recorded image may be transferred for further processing.

According to the invention, the fact that reduction of the number of pixels in a digital image typically leads to a digital image with a higher signal to noise ratio is exploited to increase the sensitivity of a system for recording a digital image. The improvement in signal to noise ratio obtained by reduction of the number of pixels depends upon the algorithm used to calculate new pixel values from old ones. If, for example, simple averaging is used and, noise in the image is normal distributed, the signal to noise ratio is improved by a factor of the square root of D when the digital image is down sized by a factor D whereby the sensitivity of the digital image is improved by the same factor. Thus, if the number of pixels of a digital image is reduced by a factor of four and the new pixel values are set to be equal to the average of the corresponding sets of four original pixel values, the signal to noise ratio of the new image is equal to two times the signal to noise ratio of the old image. If a weighted average is used for the calculation of new pixel values from old pixel values, a weighted average may be desirable to enhance various subjective features of the image, the signal to noise ratio improvement obtained is somewhat less than the improvement obtained by a simple average (in which the weight factor is equal to one for all old pixels) depending upon the actual algorithm used.

It is an important advantage of the present invention that two images of the same object may be recorded at different energy levels and different energy sensitivity parameter values corresponding to the energy levels, respectively, resulting in recorded images of substantially the same signal to noise ratio. For example, a first image may be recorded by illuminating an object to be recorded with radiated energy of a first energy level and by selecting a first energy sensitivity parameter value and, a second image may be recorded by illuminating the same object with radiated energy of half the first energy level and by selecting an energy sensitivity parameter value equal to two times the first energy sensitivity parameter value. The two resulting images have substantially the same signal to noise ratio.

Thus, in a preferred embodiment according to the invention, each second pixel value is set to be equal to the average of the corresponding set of first pixel values and the number of second pixels are set equal to the number of first pixels times the squared ratio between the first energy sensitivity parameter value divided by the desired energy sensitivity parameter value. For example, in photography, if the first digital image has a light sensitivity parameter equal to 200 ASA and the desired light sensitivity parameter is equal to 400 ASA then, the number of second pixels of the target image is set to one fourth the number of first pixels.

It is an important advantage of a system and a method according to the invention that a photographer using such a method or such a system comprising an electronic camera can work out the best compromise between resolution, light sensitivity and depth of focus of a recording of an image on a virtual film in a way very much similar to the way he is used to work out such compromises using photographic films.

The image may be recorded using a solid state imaging device, such as a CCD. As explained above, each light sensitive detector of the CCD integrates energy of light incident upon it during an integration period and accumulates a charge in it that is proportional to the integrated light energy. Before start of the integration of light energy, the detector is short-circuited so that the charge is zero at the start of the integration period. The charges of the CCD detectors are shifted serially out of the CCD array and are converted into digital pixel values.

An image may be produced from a (processed) digital image by any system adapted to receive and reproduce the digital image, such as a color printer, a color CRT, a graphical reproduction system, e.g. with an image setter, a desk top publishing system, etc.

Radiated energy to be transmitted towards an object for interaction with the object may be generated by any appropriate energy sources, such as artificial or natural light sources, such as lamps of the light bulb type, such as tungsten lamps, etc, arc lamps, such as metal-vapour lamps, etc, fluorescent tubes, such as high-frequency fluorescent tubes, household fluorescent tubes, etc, strobe lamps, flash lights, sun light, etc, X-ray sources, ultrasound transducers, infrared sources, such as heated ceramic rods, radioactive sources, etc.

Lighting is a crucial element in any form of photography and lights are among the costliest tools of the trade. The cost of lighting is proportional to the intensity of the emitted light.

It is an important advantage of the present invention that by selection of increased sensitivities of a digital image, the energy requirements of radiated energy transmitted towards objects to be recorded can be lowered. This may save investments in energy sources, such as lamps. Further, this feature of the invention may be essential when objects that can not withstand radiated energy of a high energy level are to be recorded. For example, it is desirable to minimize the X-ray dose of an X-ray treatment of a human and, for heat sensitive articles of food light intensity must be kept under a specific threshold as these articles of food can not withstand light from high intensity lamps because of radiated heat.

If, for example, a source digital image has a light sensitivity parameter value equal to 200 ASA and a target digital image having a light sensitivity parameter value equal to 400 ASA has to be formed then, according to the invention, the pixels of the recorded source image are divided into sets of first pixels, each set forming, e.g., a quadratic matrix, such as a 2 pixel * 2 pixel matrix. For each square of first pixels, a second pixel is formed having a second pixel value calculated from the first pixel values of first pixels forming the square so as to form a processed target digital image. Thus, the number of second pixels of the processed target digital image is reduced compared to the source image (in this example by a factor of 4) whereby the resolution of the target image is decreased compared to the source image. However, the amount of light (signal) incident upon a second pixel has been increased correspondingly as photons having hit the first pixels of the entire square of original first pixels are accumulated. Simultaneously, the signal to noise ratio is increased by a factor of two provided that the noise follows a normal distribution.

The first pixels of a digital image may be divided into arrays of first pixels, each of which is transformed into a second pixel, in any arbitrary way, such as in a quadratic array, a rectangular array, a polygon array, a row, a column, etc. Arrays of different sizes and shapes may be selected for transformation in different areas of the digital image and the arrays may overlap each other.

For example, if a sensitivity parameter is selected leading to a reduction of the size of a digital image by a factor of 2.5, the formation of new pixels can intuitively be visualized as formation of a new matrix of new and large pixels that covers a matrix of the original small pixels and it is seen that the new pixels will cover different numbers of original pixels and different areas of original pixels and, thus, it is intuitively understood that the new pixels may be formed from sets of original pixels that differ from each other in number and geometric form and that the formulas from which a new pixel value is calculated, typically, also will be different.

According to a preferred embodiment of the invention, each pixel value of the processed image equals a weighted average of the corresponding pixel values of the corresponding array of pixels of the original image.

A plurality of pixel component values may be defined for each pixel of a first digital image, e.g. for each pixel a pixel component value may be defined for each of the colors red, green and blue. The method described previously may then be applied successively to some or all of the pixel components by transforming the set of first pixels into the second pixel of second pixel component values so as to form a second digital image comprising said second pixels, said second digital image having for at least one of the pixel components the desired energy sensitivity parameter value.

A pixel component may correspond to any selected part of energy detected by an imaging system, such as a specific wavelength interval of the electromagnetic spectrum, such as an interval in the ultraviolet range, the infrared range, the visible range, the X-ray range, etc, a selected particle, a specific ultrasound frequency range, etc.

Further, a pixel component may also correspond to a variable in any color space to which the source image has been transformed such as the CIE 1976 L*a*b* color space, the CIE 1976 L*u*v* color space, the CIELCH (L*C*h°) color space, etc.

The transformations of pixel component values of a set of pixels into a new pixel component value of a new pixel may be different for different pixel components or the same for different pixel components.

Different transformations of pixel values of a set of pixels into a new pixel value of a new pixel may be applied to different areas of a digital image.

The user of an image processing system according to the invention may adjust interrelated resolution and sensitivity of a digital image to correspond to the resolution and light sensitivity of a specific photographic film by selection of a light sensitivity parameter of the photographic film in question, e.g. by selection of an ASA value, a DIN value, an ISO value, etc. For example, a photographer using the system may select a light sensitivity parameter value equal to 400 ASA. Upon such a selection, a photographer can use a light meter to indicate pairs of exposure time and diaphragm settings for the electronic camera that will ensure a correct exposure of the digital image when the light meter is set to indicate correct pairs of exposure time and diaphragm settings for a camera with a 400 ASA photographic film.

The image processing system may comprise a user interface employing a mouse, a pointer and graphical icons. In such a system, the user may select a desired light sensitivity parameter by moving the pointer with the mouse to an appropriate icon and select the icon with a click of the mouse. Upon the click, a list of various light sensitivity parameters can be displayed enabling the user to select a desired parameter by moving the pointer to the desired parameter and click the mouse.

An exemplary embodiment of the invention will now be described with reference to the accompanying drawings.

DETAILED DESCRIPTION OF THE DRAWINGS

Figure 1:
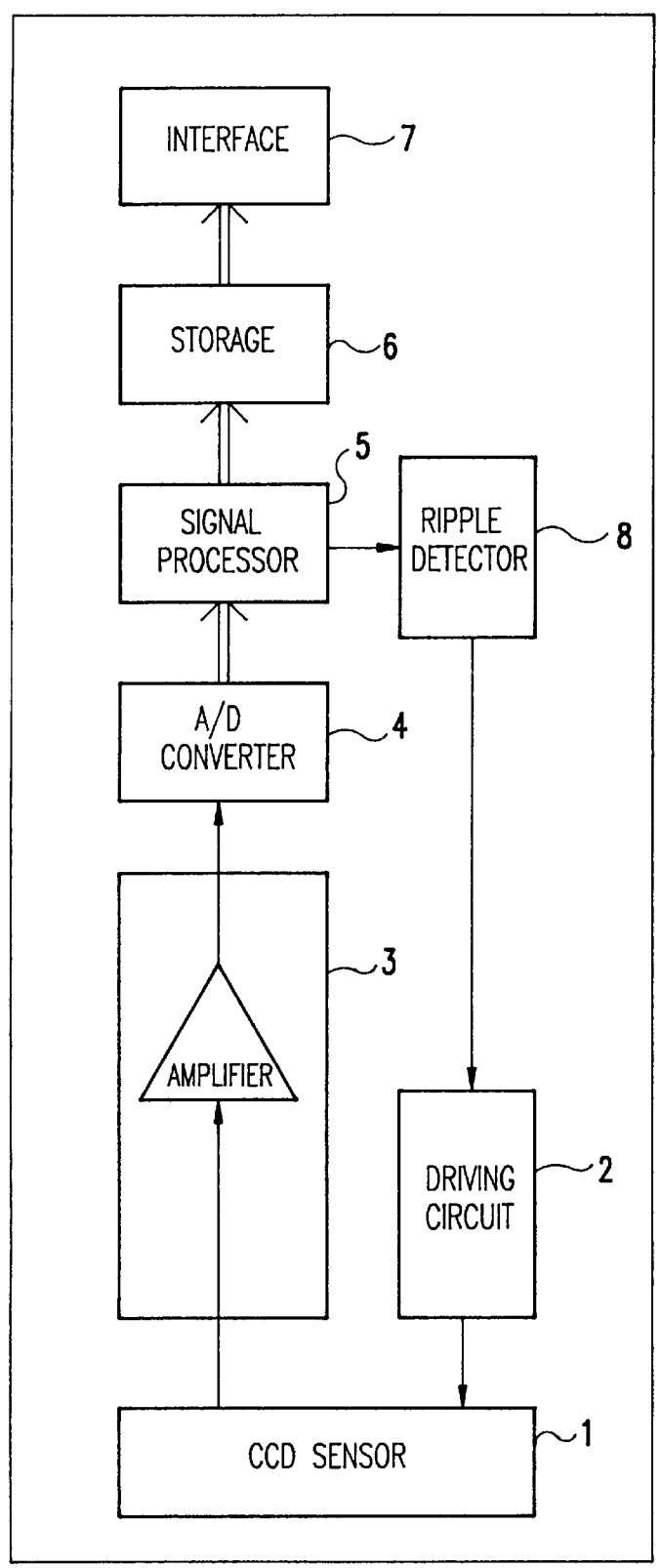
FIG. 1 is a diagram schematically showing the construction of an electronic camera for recording of digital images.

FIG. 1 is a schematic block diagram showing an electronic camera according to the present invention, in which a CCD sensor (1), a trilinear CCD is presently preferred because of its advantageous cost/performance ratio, converts a image of an object into an analog color signal. The CCD sensor (1) is controlled by a driving circuit (2), e.g. for starting of the integration (exposure) period, shifting out of the accumulated charges, etc. The analog output signal from the CCD sensor (1) is routed to an analog amplifier (3) that converts the output signal to a signal compatible with the analog to digital converter (4). The digital output values from the A/D converter (4) represent a digitized version of the recorded image. They are routed to a signal processor (5) that transfers the digital values, with or without modifications, received from the A/D converter to an image storage (6). The stored image data are then transferred through the interface (7) to a computer system (8). The computer system includes data processors and a data input device, such as a user interface.

Figure 2:
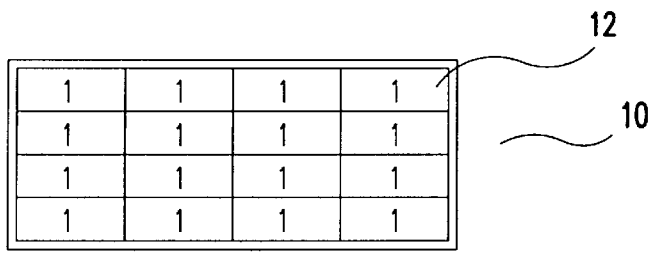
FIG. 2 illustrates the transformation of a set of pixels of a virtual film into one pixel of another virtual film.

FIG. 2 illustrates the transformation of a set of pixels of a virtual film into one pixel of another virtual film. In this example, the original set of pixels (10) comprise sixteen pixels (12). The value of the new pixel $I_{new}$ is equal to the sum of the pixel values $I_i$ (i=1, 2, . . . , 16) of the original pixels (10) multiplied by a constant C:

$$I_{new} = C \sum_{i=1}^{16} I_i \qquad (1)$$

The constant C is determined as follows.

As explained previously, the improvement in signal to noise ratio ($\Delta S/N$) by down sizing a digital image is determined by the weight function $W_i$ used when calculating a new pixel value and the down size factor (D), the down size factor being defined as the ratio of number of pixels of the source image divided by the number of pixels in the target image:

$$\Delta \frac{S}{N} = f(D, W_i) \qquad (2)$$

In the present example, the new pixels are set to be equal to the average of a corresponding set of old pixels, i.e. $W_i=1$, and, thus, $$\Delta \frac{S}{N} = \sqrt{D} \qquad (3)$$

corresponding to the improvement in light sensitivity of the new image.

C is deduced from equation (1) assuming that all first pixel values $I_i=1$:

$$I_{new} = \Delta \frac{S}{N} = \sqrt{D} = CD \qquad (4)$$

and, thus $$C = \frac{1}{\sqrt{D}} \qquad (5)$$

and $$I_{new} = \frac{1}{\sqrt{D}} \sum_{i=1}^{D} I_i \qquad (6)$$

Figure 3:
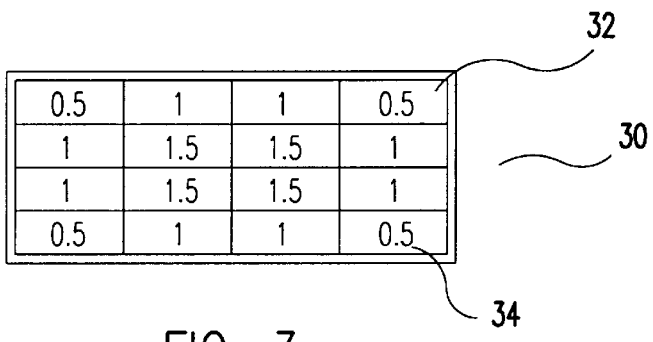
FIG. 3 illustrates another transformation of a set of pixels of a virtual film into one pixel of another virtual film.

FIG. 3 illustrates another transformation of a set of pixels of a virtual film into one pixel of another virtual film. In this example, the original set of pixels (30) also comprise sixteen pixels (32). The value of the new pixel $I_{new}$ is equal to the weighted sum (the weights (34) are also shown) of pixel values of the original pixels (30) $I_i$(i=1, 2, ..., 16) multiplied by a constant C:

$$I_{new} = C \sum_{i=1}^{16} W_i I_i \qquad (7)$$

The weights (34) are given by (the pixels are numbered from left to right and top to bottom):
  $W_i$=0.5 i=1, 4, 13, and 16
  $W_i$=1 i=2, 3, 5, 8, 9, 12, 14, and 15
  $W_i$=1.5 i=6, 7, 10, and 11
The constant C is determined as described above inserting the new weight function $W_i$ in (2).

Figure 4:
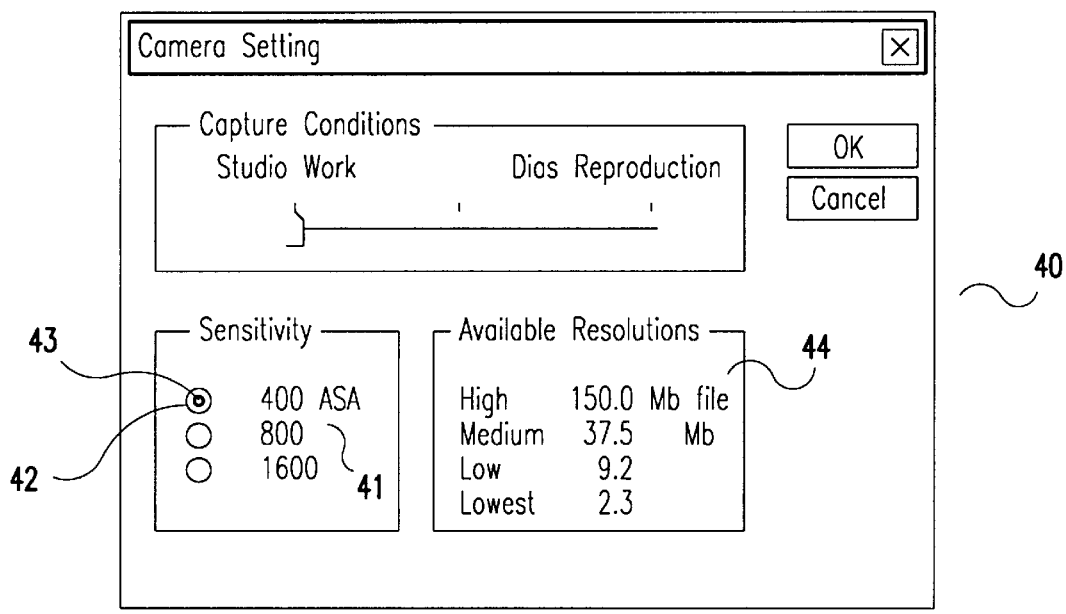
FIG. 4 shows a dialogue window for selection of a light sensitivity parameter value.
Figure 5:
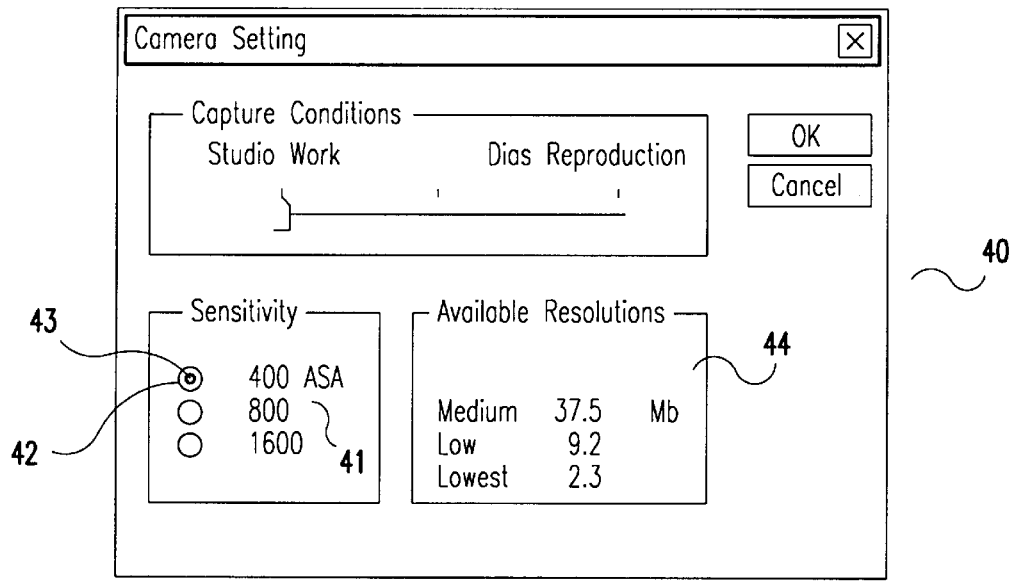
FIG. 5 shows a dialogue window for selection of a light sensitivity parameter value.
Figure 6:
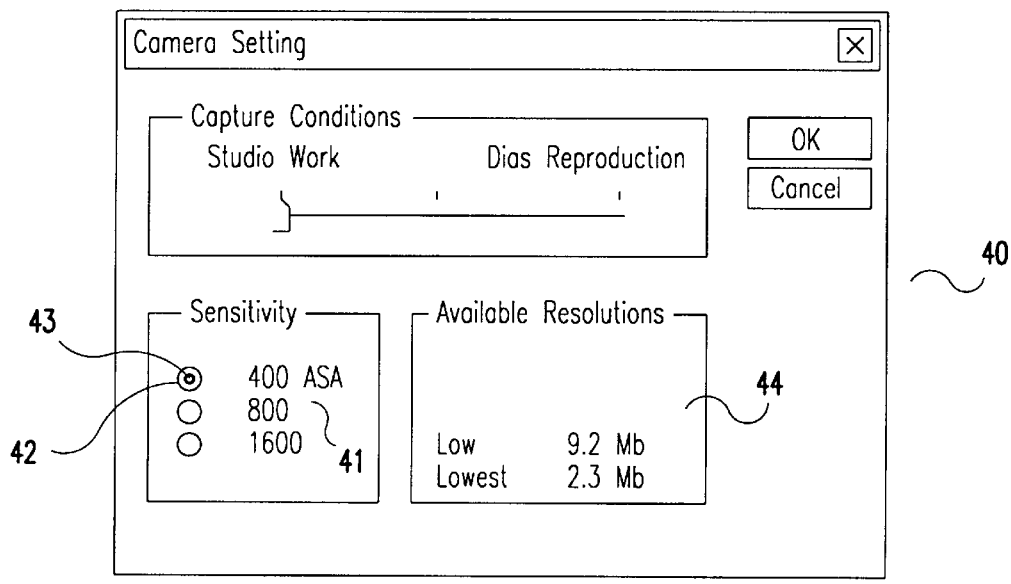
FIG. 6 shows a dialogue window for selection of a light sensitivity parameter value.

FIGS. 4, 5, and 6 show a dialogue window 40 for selection of a light sensitivity parameter value. The user may select a desired light sensitivity parameter value 41 in ASA units by moving a pointer with the mouse to a circle 42 positioned to the left of the desired value 41 and select the value 41 with a click of the mouse. Upon the click, a dot 43 is displayed in the corresponding circle 42. To the right of each light sensitivity parameter value 41, the resolution 44 of the corresponding digital image is displayed as the size in Megabytes of the file containing the digital image. Resolutions not available for a selected light sensitivity parameter value are dimmed. For example, in FIG. 5, 150 Mbyte resolution is shown not to be available for an 800 ASA digital image.

We claim:

1. A method of processing a source digital image with a first energy sensitivity parameter value and including a number of first pixels having first pixel values into a target digital image, said method comprising:
   generating a desired second energy sensitivity parameter value for the target digital image;
   determining a number of second pixels having second pixel values in the target digital image corresponding to the desired second energy sensitivity parameter value from the number of first pixels in the source digital image and the first energy sensitivity parameter value;
   generating successively, for each of the second pixels, a corresponding set of first pixels;
   transforming each set of first pixels into corresponding second pixels of the second pixel values; and
   forming a target digital image comprising said corresponding second pixels having the desired energy sensitivity parameter.

2. A method according to claim 1, wherein the source digital image is recorded by an electronic camera.

3. A method according to claim 2, wherein the energy sensitivity parameter is a light sensitivity parameter specified in units of light sensitivity of a photographic film in such a way that a digital image with a specific sensitivity parameter value has the same light sensitivity as a photographic film with the same light sensitivity parameter value so that a photographer can use a light meter to indicate pairs of exposure time and diaphragm settings for the electronic camera that will ensure a correct exposure of the target digital image when the light meter is set to indicate correct pairs of exposure time and diaphragm settings for a camera with a photographic film with the desired light sensitivity parameter value.

4. A method according to claim 3, wherein each set of first pixels are transformed into a second pixel of a second pixel value which is equal to a weighted average of the corresponding first pixel values.

5. A method of processing a source digital image with a first energy sensitivity parameter value and including a number of first pixels having a plurality of first pixel component values into a target digital image, said method comprising:
   generating a desired second energy sensitivity parameter value for the target digital image;
   determining a number of second pixels having a plurality of second pixel component values in the target digital image corresponding to the desired second energy sensitivity parameter value from the number of first pixels in the source digital image and the first energy sensitivity parameter value;
   generating successively, for each of the second pixels, a corresponding set of first pixels;
   transforming each set of first pixels into corresponding second pixels of the second pixel component values; and
   forming a second digital image comprising said corresponding second pixels, said second digital image having, for at least one of the second pixel component values, the desired energy sensitivity parameter.

6. An image processing system for processing a source digital image with a first energy sensitivity parameter value and including a number of first pixels having first pixel values into a target digital image, said system comprising:
   an input which receives a selected second energy sensitivity parameter value for the target digital image;
   a first processor which determines a number of second pixels having second pixel values in the target digital image corresponding to the selected second energy sensitivity parameter value from the number of first pixels in the source digital image and the first energy sensitivity parameter value; and
   a second processor which successively generates, for each of the second pixels, a corresponding set of first pixels and which transforms each set of first pixels into corresponding second pixels of the second pixel values so as to form a target digital image comprising said second corresponding pixels and having the selected energy sensitivity parameter value.

7. A system according to claim 6, comprising an electronic camera for generating the source digital image.

8. A system according to claim 7, wherein the user interface means comprise means for specifying the energy sensitivity parameter value in units of a light sensitivity parameter of a photographic film in such a way that a digital image with a specific sensitivity parameter value has the same light sensitivity as a photographic film with the same light sensitivity parameter value so that a photographer can use a light meter to indicate pairs of exposure time and diaphragm settings for the electronic camera that will ensure a correct exposure of the target digital image when the light meter is set to indicate correct pairs of exposure time and diaphragm settings for a camera with a photographic film with the desired light sensitivity parameter value.

9. A system according to claim 8, wherein the second processor means calculates for each set of pixels a weighted average of the first pixel values so that each of the second pixel values becomes equal to the corresponding weighted average.

10. An image processing system for processing a source digital image with a first energy sensitivity parameter value and including a number of pixels having a plurality of first pixel component values into a target digital image, said system comprising:

an input which receives a selected second energy sensitivity parameter value for the target digital image;

a first processor which determines a number of second pixels having a plurality of second component pixel values in the target digital image corresponding to the selected second energy sensitivity parameter value from the number of first pixels in the source digital image and the first energy sensitivity parameter value; and a second processor which successively generates, for each of the second pixels, a corresponding set of first pixels and which transforms each set of first pixels into corresponding second pixels of the second pixel component values so as to form a target digital image comprising said corresponding second pixels and having the selected energy sensitivity parameter value.

* * * * *